(No Model.)  2 Sheets—Sheet 1.

F. ALSIP & C. T. DRAKE.
CLAY CRUSHING MACHINE.

No. 320,905. Patented June 30, 1885.

Witnesses:
W. L. Baker
David Stevens

Inventor
Frank Alsip
Chester T. Drake
per Gridley & Fletcher,
Attorneys.

(No Model.) 2 Sheets—Sheet 2.
F. ALSIP & C. T. DRAKE.
CLAY CRUSHING MACHINE.
No. 320,905. Patented June 30, 1885.
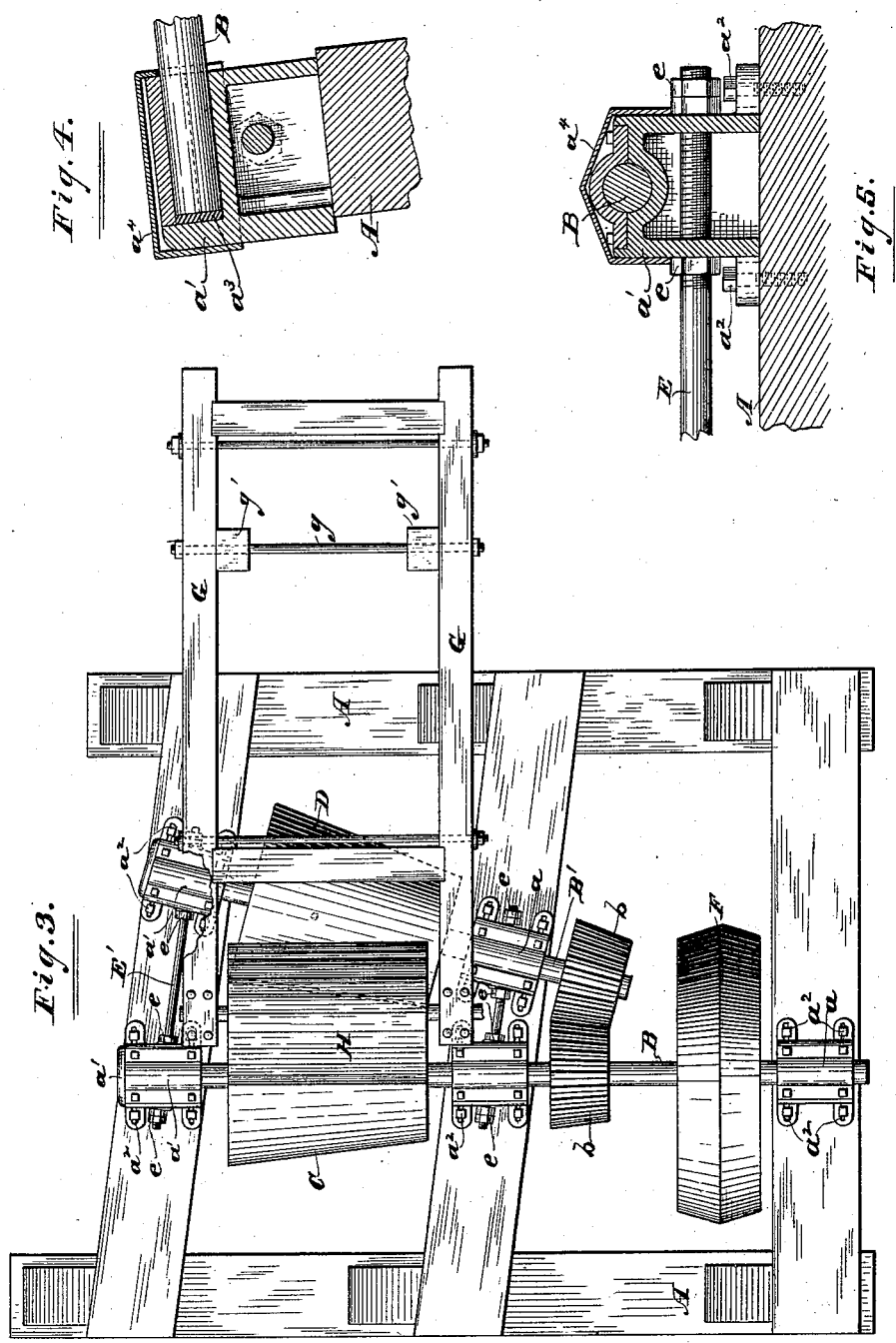

UNITED STATES PATENT OFFICE

FRANK ALSIP AND CHESTER T. DRAKE, OF CHICAGO, ILLINOIS.

CLAY-CRUSHING MACHINE.

SPECIFICATION forming part of Letters Patent No. 320,905, dated June 30, 1885.

Application filed June 17, 1884. (No model.)

*To all whom it may concern:*

Be it known that we, FRANK ALSIP and CHESTER T. DRAKE, of Chicago, in the county of Cook and State of Illinois, have invented certain new and useful Improvements in Clay-Crushing Machines, of which the following is a description, reference being had to the accompanying drawings, in which—

Figure 1:
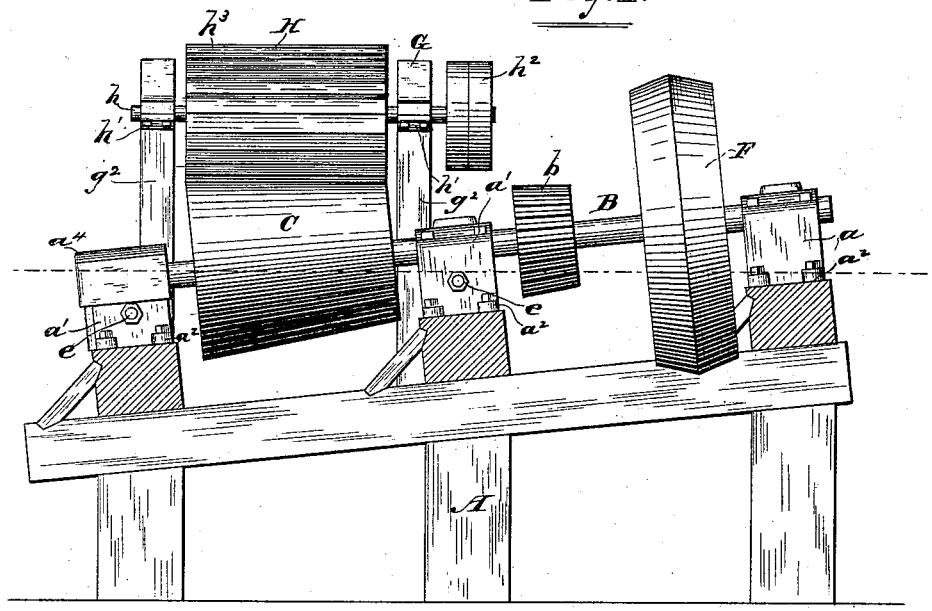
Figure 2:
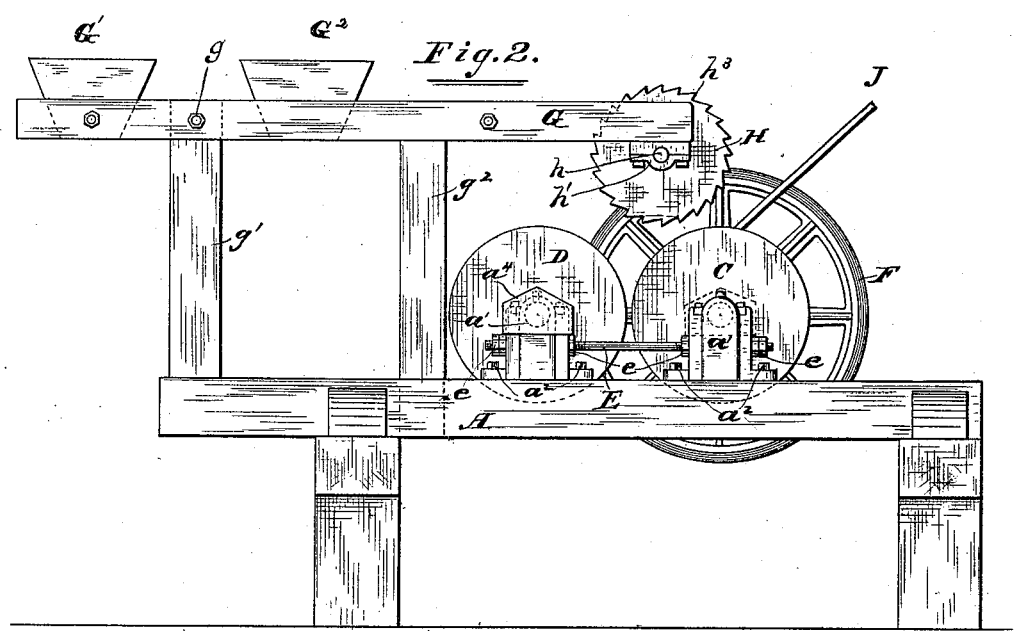

Figure 1 is a side view of said machine. Fig. 2 is an end view. Fig. 3 is a plan view. Fig. 4 is a central longitudinal vertical sectional view in detail of one of the lower bearings or steps which support the inclined shaft; and Fig. 5 is a transverse vertical sectional view in detail of one of said bearings, showing a connecting-rod for adjusting the same with reference to the crushing-rollers.

Like letters of reference indicate like parts in the different figures.

The object of our invention is to provide a clay-grinding machine which may be simple in its construction and operation and which may readily and automatically separate the stones, gravel, and other foreign substances from the clay as the latter is being ground, and instead of allowing them to remain between the rollers indefinitely, and thus obstruct and prevent the entry of the clay, will remove said obstructions as rapidly as presented.

A further object is to provide a mulling mechanism in connection with said machine for the purpose of breaking the larger lumps and clods as they are fed therein, and which may automatically move up and down to permit the passage of stones and the like, and the pressure of which may be varied at will to suit the varying conditions of the clay, all of which will be hereinafter more fully described, and definitely pointed out in the claims.

In the drawings, A represents the framework of the machine, the top of which is placed at an angle to the plane of the horizon, as illustrated in Fig. 1, the latter being indicated by the dotted lines there shown. Secured to the cross-timbers A A A are boxes or bearings $a$ $a$ $a'$ $a'$, which are laterally adjustable by means of the bolts $a^2$ and the slots in the base of said bearings, as clearly shown in Fig. 3. Adjusted in said bearings are shafts B B', upon which, respectively, are rigidly secured the bevel-pinions $b$ $b$ and the cone-shaped rollers C D, said rollers being preferably made of chilled iron. The angle at which the shafts B B' are placed with respect to each other should correspond to the bevel of the rollers C D, so that the respective faces may be parallel, as indicated in dotted lines in Fig. 3, while the upper surface of said rollers is preferably in a horizontal plane or thereabout.

The bearings $a$ $a$ and $a'$ $a'$, respectively, are connected by means of rods E E', Figs. 2, 3, and 5, said rods being provided with screw-threads upon the respective ends and nuts $e$, whereby upon loosening the bolts $a^2$ the position of the rollers C D with relation to each other may be adjusted to any degree of fineness desired by means of the nuts $e$.

I prefer to operate the shaft B by means of a cone-pulley, F, and belt; and, as said shaft is placed in an oblique position, it is important that said pulley should be coned to a considerable degree, as shown, in order to prevent said belt from running off.

As the rollers C D are of great weight, the tilting of said shafts B B' renders it necessary to provide end bearings therefor. This I accomplish by closing the lower ends of the bearings $a'$ $a'$, as shown in Fig. 4, and placing therein steel plates or steps $a^3$, against which the ends of said shafts, respectively, bear. Above the roller C, and secured to a movable frame, G, I place a "muller," H, which is rigidly secured upon a shaft, $h$, adapted to revolve in bearings $h'$ $h'$, a pulley, $h^2$ $h^2$, being placed upon said shaft to propel the same. The horizontal frame G, to which the muller H is secured, is pivoted by means of a bolt or rod, $g$, to two stationary upright posts, $g'$ $g'$, which are rigidly secured in any suitable manner to the frame A. Other posts, $g^2$ $g^2$, likewise rigidly secured to said frame A, serve as rests or supports for the frame G and to limit its downward movement and prevent contact with the roller C. Said muller H is grooved in the manner shown, to form teeth or sharp-pointed corrugations $h^3$, which serve, by the weight of said muller, to cut or crush the lumps of clay as the same are fed into the hopper J preparatory to passing between the rollers C D. The belt upon the pulley $h^2$ is so adjusted as to permit an upward movement of said muller in case the same is brought in contact with stones or other hard substances in the clay.

It is necessary to adjust the weight or pressure of said muller to the varying consistency or stiffness of the clay, to accomplish which cheaply and effectually we preferably provide stationary boxes G' G² upon the frame G upon opposite sides of the posts g', to which said frame is pivoted. If the clay is very stiff, the box G² may be weighted with stones or otherwise, and if more plastic the weight may be partially or wholly transferred to the box G'. Thus it is obvious that the pressure of the muller may be varied at will and to any extent required. We do not confine ourselves to the specific means shown for varying the pressure of said muller, as it is evident that a single sliding weight upon said frame may accomplish the same purpose.

As the clay and grit from the rollers are constantly falling upon the bearings a' a', we protect said bearings by means of close-fitting boxes or caps, $a^4$ $a^4$, preferably made from cast-iron, in the manner shown in Figs. 1, 2, 4, and 5, which are made removable in order to oil said bearings.

It is now a common practice in the art to employ two co-operating conical rolls the axes of which are horizontal and the upper surfaces of which are consequently inclined to grind clay and remove stones therefrom.

It is a well-known fact that in the use of conical rolls the axes of which are placed horizontally the tendency is to retain gravel, stones, and other hard substances in the space between them, thus not only clogging the opening and preventing the clay from passing through, but causing grooves to wear therein, thereby rendering them worthless.

Our invention is intended to overcome these difficulties; and we have discovered that by placing the axes of said rollers in such a plane at an angle to the plane of the horizon as to cause the upper surface of said rollers to be horizontal, or nearly so, this tendency to retain obstructions between the rollers is overcome, and the stones are thrown off at once from the larger ends of the rolls, thus permitting the clay to pass through freely and much more rapidly; and, while we do not confine ourselves to the use of said rolls in the exact position here shown and described, we prefer not to vary materially therefrom, as we believe that such adjustment, or one approximating thereto, is adapted to produce the most satisfactory results.

As a further and important advantage of said improvement, the waste clay thrown off may be again thrown into the hopper and passed through the rolls, thus saving a considerable amount of material which would otherwise be wasted.

We do not claim, broadly, the conical rolls described.

What we do claim, and desire to secure by Letters Patent, is—

1. A mechanism for crushing clay and removing stones therefrom, consisting of two co-operating conical rolls arranged with their axes at an angle to the plane of the horizon, and their upper surfaces substantially horizontal, as contradistinguished from conical rolls the axes of which are horizontal.

2. In combination with the supporting-frame and driving-gear, the two co-operating conical rolls having their rolls in a common plane oblique to the horizon, and their top surfaces in a common horizontal plane, as contradistinguished from rolls the top surfaces of which are inclined longitudinally.

3. In a clay-crushing machine, the combination of the adjusting-rods E E' with conical clay-crushing rollers having their axes arranged in a plane oblique to the plane of the horizon, and means for propelling the same, substantially as described.

4. In a clay-crushing machine, the combination of the conical rollers C D, shafts B B', arranged as described, with suitable bearings, adjusting-rods E E', set-screws e, and caps $a^4$ $a^4$, substantially as described.

5. In a clay-crushing machine, the combination of the conical rollers C D upon the tilted shafts B B' with a grooved muller constructed and arranged as described, and means for propelling said shafts and muller, respectively, substantially as and for the purposes set forth.

6. In a clay-crushing machine, the combination, with suitable rolls, of a muller arranged upon one end of a pivoted frame, provided with movable weights, whereby the downward pressure of said muller may be increased or diminished at will, substantially as described.

FRANK ALSIP.
CHESTER T. DRAKE.

Witnesses:
D. H. FLETCHER,
W. S. BAKER.